(12) United States Patent
Huang et al.

(10) Patent No.: US 12,463,478 B2
(45) Date of Patent: Nov. 4, 2025

(54) ROTOR, PERMANENT-MAGNET MOTOR, MOTOR DRIVE SYSTEM, AND VEHICLE

(71) Applicant: Shenzhen Yinwang Intelligent Technologies Co., Ltd., Shenzhen (CN)

(72) Inventors: Xin Huang, Shanghai (CN); Mengde Li, Shanghai (CN); Hui Yang, Nanjing (CN); Heyun Lin, Nanjing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 239 days.

(21) Appl. No.: 18/048,424

(22) Filed: Oct. 20, 2022

(65) Prior Publication Data

US 2023/0108575 A1 Apr. 6, 2023

Related U.S. Application Data

(63) Continuation of application No. PCT/CN2020/088525, filed on Apr. 30, 2020.

(51) Int. Cl.
*H02K 1/27* (2022.01)
*B60K 1/00* (2006.01)
(Continued)

(52) U.S. Cl.
CPC ............ *H02K 1/2773* (2013.01); *B60K 1/00* (2013.01); *H02K 1/02* (2013.01)

(58) Field of Classification Search
CPC .......... B60K 1/00; H02K 1/2773; H02K 1/02; H02K 1/278; H02K 21/16; H02K 1/28; H02K 1/146; H02K 3/47
See application file for complete search history.

(56) References Cited

U.S. PATENT DOCUMENTS

| 7,436,095 | B2* | 10/2008 | Aydin | H02K 1/278 310/156.53 |
| 2012/0299429 | A1* | 11/2012 | Choi | H02K 1/2773 310/156.12 |

(Continued)

FOREIGN PATENT DOCUMENTS

| CN | 103038981 A | 4/2013 |
| CN | 103872819 A | 6/2014 |

(Continued)

OTHER PUBLICATIONS

CN-109831084-A machine translation Mar. 29, 2025.*

*Primary Examiner* — Leda T Pham
(74) *Attorney, Agent, or Firm* — Leydig, Voit & Mayer, Ltd.

(57) ABSTRACT

A rotor is provided, and is used in a permanent-magnet motor. The rotor includes a rotating shaft (111) and a rotor iron core (112) sleeved on the rotating shaft (111). The rotor further includes several first permanent-magnet structures (14), the several first permanent-magnet structures (14) are distributed on the rotor iron core (112) in a circumferential direction of the rotor iron core (112), each first permanent-magnet structure (14) includes a first permanent magnet (141) and a second permanent magnet (142) that are disposed in a radial direction of the rotor iron core (112), and coercive force of the first permanent magnet (141) is less than coercive force of the second permanent magnet (142).

20 Claims, 8 Drawing Sheets

(51) Int. Cl.
*H02K 1/02* (2006.01)
*H02K 1/276* (2022.01)

(56) References Cited

U.S. PATENT DOCUMENTS

| | | | |
|---|---|---|---|
| 2013/0127280 A1* | 5/2013 | Sugimoto | H02K 1/02 |
| | | | 310/156.01 |
| 2014/0152139 A1* | 6/2014 | Huang | H02K 1/2766 |
| | | | 310/156.38 |
| 2015/0028707 A1 | 1/2015 | Kim et al. | |
| 2016/0105059 A1 | 4/2016 | El Baraka et al. | |
| 2016/0359398 A1* | 12/2016 | Shibata | H02K 15/03 |
| 2018/0097412 A1* | 4/2018 | Xiao | H02K 1/2766 |

FOREIGN PATENT DOCUMENTS

| | | | |
|---|---|---|---|
| CN | 204669114 U | | 9/2015 |
| CN | 107968501 A | | 4/2018 |
| CN | 107994702 A | | 5/2018 |
| CN | 108599418 A | | 9/2018 |
| CN | 109088494 A | | 12/2018 |
| CN | 109412293 A | | 3/2019 |
| CN | 109802541 A | | 5/2019 |
| CN | 109831084 A | * | 5/2019 |
| CN | 110431735 A | | 11/2019 |
| CN | 110971038 A | | 4/2020 |
| JP | H11113199 A | | 4/1999 |

* cited by examiner

ROTOR, PERMANENT-MAGNET MOTOR, MOTOR DRIVE SYSTEM, AND VEHICLE

CROSS-REFERENCE TO RELATED DISCLOSURES

This disclosure is a continuation of International Disclosure No. PCT/CN 2020/088525, filed on Apr. 30, 2020, the disclosure of which is hereby incorporated by reference in its entirety.

TECHNICAL FIELD

This disclosure relates to the field of motor technologies, and in particular, to a rotor, a permanent-magnet motor, a motor drive system, and a vehicle.

BACKGROUND

A permanent-magnet memory motor is a new type of permanent-magnet motor with controllable flux. The permanent-magnet memory motor uses an Alnico permanent magnet with low coercive force to generate a circumferential magnetic field by using a stator winding or a direct current pulse winding, so as to change a magnetization degree of the permanent magnet, and adjust a magnetic field of an air gap. In addition, the permanent magnet with low coercive force is characterized by a magnetic density level that can be memorized. A hybrid permanent-magnet memory motor with adjustable flux is a motor including two types of permanent magnets. A magnetic circuit falls into a parallel magnetic circuit and a series magnetic circuit based on an arrangement manner of the two types of permanent magnets. The parallel magnetic circuit has an advantage of a small demagnetization circuit pulse and a large flux adjustment range. However, stability of a magnetization state of the motor is not high. In the series magnetic circuit, stability of a magnetization state is high, but a flux adjustment range is limited. Therefore, a topology structure of the hybrid permanent-magnet memory motor formed by mixing the two types of magnetic circuits becomes a focus of research.

Currently, a common permanent-magnet memory motor includes a stator, a rotor, and an armature winding. The rotor includes a rotating shaft and a rotor iron core disposed on the rotating shaft. The stator is sleeved on a periphery of the rotor iron core. The armature winding is disposed on the stator. A first permanent magnet, a second permanent magnet, and a third permanent magnet are disposed on the rotor iron core. The first permanent magnet is linear, and is distributed in a radial direction of the rotor iron core. The second permanent magnet and the third permanent magnet form a V-shaped structure, and an opening of the V-shaped structure faces the stator. In addition, the second permanent magnet is close to the stator, and the third permanent magnet is far away from the stator. Coercive force of the first permanent magnet is greater than coercive force of the third permanent magnet, and coercive force of the second permanent magnet is greater than the coercive force of the third permanent magnet. In this way, the first permanent magnet and the second permanent magnet form a series magnetic circuit, and the second permanent magnet and the third permanent magnet form a parallel magnetic circuit, so that a flux adjustment capability of the motor is improved while a magnetization-state stabilization capability of the permanent-magnet motor is ensured.

However, in the foregoing permanent-magnet memory motor, the coercive force of the first permanent magnet and the second permanent magnet that form the series magnetic circuit is large, a large flux adjustment current is required, and a flux adjustment range needs to be further expand.

SUMMARY

This disclosure provides a rotor, a permanent-magnet motor, a motor drive system, and a vehicle, to effectively improve a flux adjustment range of the motor, and resolve a problem that an existing motor requires a large flux adjustment current and a flux adjustment range thereof needs to be further improved.

According to a first aspect, an embodiment of this disclosure provides a rotor, where the rotor is used in a permanent-magnet motor, and includes a rotating shaft and a rotor iron core sleeved on the rotating shaft.

The rotor further includes several first permanent-magnet structures, the several first permanent-magnet structures are distributed on the rotor iron core in a circumferential direction of the rotor iron core, each first permanent-magnet structure includes a first permanent magnet and a second permanent magnet that are disposed in a radial direction of the rotor iron core, and coercive force of the first permanent magnet is less than coercive force of the second permanent magnet. In this way, the first permanent magnet is a permanent magnet with low coercive force, and the second permanent magnet is a permanent magnet with high coercive force. Main flux of an air gap may be regulated and controlled by using a magnetization degree and a demagnetization degree of the first permanent magnet with low coercive force. During flux weakening, a part of main flux is short-circuited by using the first permanent magnet with low coercive force, so that a permanent magnetic field implements a short circuit of a magnetic line inside the rotor during flux weakening, to reduce saturation of a magnetic circuit, and effectively improve a flux adjustment range. In addition, a first permanent magnet and a second permanent magnet that are adjacent to each other are staggered, and the first permanent magnet with low coercive force blocks, to a degree, flux generated by the second permanent magnet with high coercive force, so that the flux cannot pass through the air gap, and a magnetic energy product is weakened, to reduce saturation of flux inside the rotor, and help improve a flux adjustment capability.

In a possible implementation of the first aspect, the rotor further includes several second permanent-magnet structures, the second permanent-magnet structure is located between a first permanent magnet and a second permanent magnet in a same first permanent-magnet structure, and the second permanent-magnet structure is far away from the rotating shaft. In this way, the second permanent-magnet structure and the first permanent magnet form a series magnetic circuit, the second permanent-magnet structure and the second permanent magnet also form a series magnetic circuit, a first permanent magnet and a second permanent magnet in a same first permanent-magnet structure form a series magnetic circuit, and a first permanent magnet and a second permanent magnet in adjacent first permanent-magnet structures also form a series magnetic circuit, so that the motor has good magnetization-state stabilization performance.

In a possible implementation of the first aspect, the second permanent-magnet structure includes a third permanent magnet and a fourth permanent magnet, and the third permanent magnet is located on two sides of the fourth permanent magnet. In this way, the third permanent magnet and the fourth permanent magnet form a parallel magnetic circuit. During flux weakening, a magnetic field of the two types of permanent magnets in the parallel magnetic circuit may form a short circuit inside the rotor, to further improve the flux adjustment range.

In a possible implementation of the first aspect, coercive force of the fourth permanent magnet is less than coercive force of the third permanent magnet. The fourth permanent magnet and the second permanent magnet form a series magnetic circuit structure, and a first permanent magnet and a second permanent magnet that are adjacent to each other also form a series magnetic circuit structure. In such a series magnetic circuit structure, a permanent magnet (the first permanent magnet and the fourth permanent magnet) with low coercive force has magnetic line support from a permanent magnet (the second permanent magnet and the third permanent magnet) with high coercive force, and therefore has a significant load demagnetization resistance capability.

In a possible implementation of the first aspect, in two adjacent first permanent-magnet structures, a first permanent magnet in one first permanent-magnet structure is close to a second permanent magnet in the other first permanent-magnet structure. In this way, a second permanent magnet with high coercive force is disposed at a location adjacent to each first permanent magnet with low coercive force, so that the motor has better magnetization-state stabilization performance.

In a possible implementation of the first aspect, the second permanent-magnet structure is U-shaped, and an opening of the second permanent-magnet structure faces a side far away from the rotating shaft. The second permanent-magnet structure is U-shaped, and has a very good flux aggregation effect.

In a possible implementation of the first aspect, the first permanent-magnet structure is V-shaped, and an opening of the first permanent-magnet structure faces the side far away from the rotating shaft. The V-shaped permanent-magnet structure has a very good flux aggregation effect.

In a possible implementation of the first aspect, the first permanent magnet and the second permanent magnet are separately magnetized in a tangential direction of a circumference of the rotor iron core, the third permanent magnet is magnetized in a tangential direction of a circumference surrounded by a plurality of third permanent magnets, and the fourth permanent magnet is magnetized in a radial direction of the circumference of the rotor iron core. Therefore, the first permanent magnet and the second permanent magnet are magnetized in the tangential direction of the circumference of the rotor iron core, the third permanent magnet is magnetized in the tangential direction of the circumference surrounded by the plurality of third permanent magnets, and the fourth permanent magnet is magnetized in the radial direction of the circumference of the rotor iron core. In this way, flux of the four permanent magnets is superposed and then flows in a same direction.

In a possible implementation of the first aspect, the first permanent-magnet structure and the second permanent-magnet structure form a magnetic pole, two third permanent magnets at a same magnetic pole are magnetized in opposite directions, fourth permanent magnets at adjacent magnetic poles are magnetized in opposite directions, a first permanent magnet and a second permanent magnet at a same magnetic pole are magnetized in opposite directions, and a first permanent magnet and a second permanent magnet at adjacent magnetic poles are magnetized in a same direction. In this way, flux of the permanent magnets is superposed and then flows in a same direction to form a loop, so as to form a rotating magnetic field. A three-phase alternating current consistent with a rotation speed of the rotor is introduced into an armature winding, and interacts with the rotating magnetic field formed by the rotor, to implement electromechanical energy conversion.

In a possible implementation of the first aspect, a magnetic barrier is further disposed on the rotor iron core, the magnetic barrier is located between the first permanent magnet and the second permanent magnet, and the magnetic barrier is close to the rotating shaft. The magnetic barrier can enhance direct-axis magnetic resistance, to reduce magnetic leakage.

In a possible implementation of the first aspect, a shape of the magnetic barrier is a circle. Compared with an existing manner of using a triangular magnetic barrier or the like, each triangular magnetic barrier is generally distributed in the radial direction of the rotor iron core, and extends from an end of the rotor iron core close to the rotating shaft to an end of the rotor iron core close to a stator. As a result, stress distribution of the rotor iron core is saturated, it is difficult to ensure mechanical strength of the rotor, and the rotor iron core is not applicable to a high-speed running area. However, in this embodiment of this disclosure, the magnetic barrier is circular, and is close to the rotating shaft, so that such a problem can be avoided, and the circular magnetic barrier can facilitate mechanical treatment of the rotor.

In a possible implementation of the first aspect, a quantity of first permanent-magnet structures is the same as a quantity of second permanent-magnet structures, and the quantity is an even number.

In a possible implementation of the first aspect, the first permanent magnet is an Alnico permanent magnet, and the second permanent magnet is an NdFeB permanent magnet.

In a possible implementation of the first aspect, the third permanent magnet is an NdFeB permanent magnet, and the fourth permanent magnet is an Alnico permanent magnet.

In a possible implementation of the first aspect, a first magnetic groove and a second magnetic groove are disposed on the rotor iron core, the first permanent-magnet structure is disposed in the first magnetic groove, and the second permanent-magnet structure is disposed in the second magnetic groove. The first magnetic groove and the second magnetic groove are respectively used to place and mount the first permanent-magnet structure and the second permanent-magnet structure.

According to a second aspect, an embodiment of this disclosure provides a permanent-magnet motor, including a stator, an armature winding, and the rotor in any one of the foregoing implementations, where the stator is sleeved on a periphery of a rotor iron core of the rotor, and the armature winding is disposed on the stator.

The permanent-magnet motor includes the rotor, the rotor includes several first permanent-magnet structures, the first permanent-magnet structure includes a first permanent magnet and a second permanent magnet that are distributed in a radial direction the rotor iron core of the rotor, and coercive force of the first permanent magnet is less than coercive force of the second permanent magnet. In this way, main flux of an air gap may be regulated and controlled by using a magnetization degree and a demagnetization degree of the first permanent magnet with low coercive force. During flux weakening, a part of main flux is short-circuited by using the first permanent magnet with low coercive force, so that a permanent magnetic field implements a short circuit of a magnetic line inside the rotor during flux weakening, to reduce saturation of a magnetic circuit, and effectively improve a flux adjustment range. In addition, a first permanent magnet and a second permanent magnet that are adjacent to each other are staggered, and the first permanent magnet with low coercive force blocks, to a degree, flux generated by the second permanent magnet with high coercive force, so that the flux cannot pass through the air gap, and a magnetic energy product is weakened, to reduce saturation of flux inside the rotor, and help improve a flux adjustment capability.

According to a third aspect, an embodiment of this disclosure provides a motor drive system, including a controller, a battery, and the foregoing permanent-magnet motor, where the battery and the controller are separately connected to the permanent-magnet motor. The motor drive system includes the permanent-magnet motor. The permanent-magnet motor implements a short circuit of most magnetic lines inside a rotor during flux weakening, to reduce saturation of a magnetic circuit, so that a flux adjustment range is effectively improved, global efficiency is improved, and it is ensured that the motor drive system always maintains high efficiency in various running states.

According to a fourth aspect, an embodiment of this disclosure provides an electric vehicle, including a vehicle frame and the foregoing motor drive system, where the motor drive system is mounted on the vehicle frame. The electric vehicle includes the motor drive system, and the motor drive system has high efficiency in various running states. This can effectively increase an endurance mileage of the vehicle, and improve overall running efficiency of the vehicle.

DESCRIPTION OF REFERENCE NUMERALS

Figure 1:
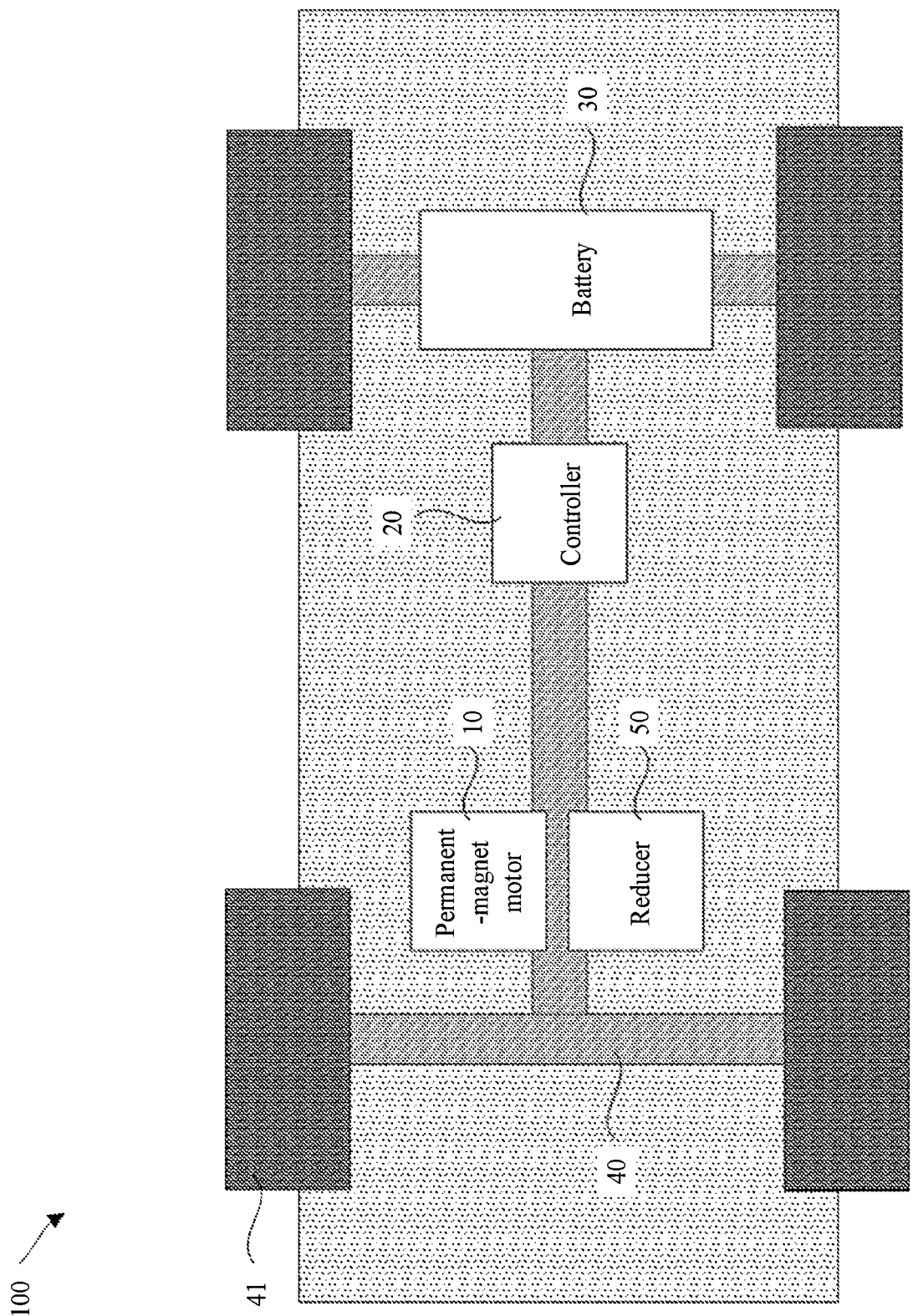
FIG. 1 is a schematic diagram of a structure of an electric vehicle according to an embodiment of this disclosure.

100—electric vehicle; 10—permanent-magnet motor; 11—rotor;
111—rotating shaft; 112—rotor iron core; 113—magnetic barrier;
114—first magnetic groove; 114a—first magnetic groove part; 114b—second magnetic groove part;
115—second magnetic groove; 12—stator; 121—stator iron core tooth;
122—stator yoke; 123—cavity; 13—armature winding;
14—first permanent-magnet structure; 141—first permanent magnet; 142—second permanent magnet;
15—second permanent-magnet structure; 151—third permanent magnet; 152—fourth permanent magnet;
16—air gap; 20—controller; 30—battery;
40—vehicle frame; 41—wheel; 50—reducer.

DESCRIPTION OF EMBODIMENTS

Terms used in embodiments of this disclosure are only used to explain specific embodiments of this disclosure, but are not intended to limit this scope of the teachings of this disclosure.

With a requirement for an endurance mileage of a vehicle, high efficiency of a motor has become a focus of research. However, a magnetic field of an air gap of a conventional vehicular PMSM (permanent-magnet synchronous motor, permanent-magnet synchronous motor) cannot be adjusted. As a result, a speed adjustment range is limited, and there are two contradictory problems: "high torque at a low speed" and "high power at a high speed". To be specific, from the perspective of low-speed climbing, large permanent-magnet flux linkage is required to obtain a large torque coefficient and a large torque density; and from the perspective of high-speed performance, small permanent-magnet flux linkage is required to improve a high-speed output capability. Consequently, an improvement to global efficiency of the motor is affected. A permanent-magnet memory motor with adjustable flux may effectively adjust a magnetic field of an air gap. To be specific, large flux may be obtained at a low speed, so that a large torque coefficient and a large torque density exist; and small flux may be obtained at a high speed, to effectively ensure a high-speed output capability. Therefore, global efficiency is improved. When the permanent-magnet memory motor with adjustable flux is applied to an electric vehicle and the like, running in a multi-kilometer mode may be implemented, so that better power matching exists between the motor and a battery, a constant power running area is effectively widened, and global efficiency is improved.

Currently, an existing hybrid permanent-magnet memory motor is mainly excited jointly by two permanent magnets with different materials, and an NdFeB permanent magnet and an Alnico permanent magnet are disposed inside a rotor of the hybrid permanent-magnet memory motor. The NdFeB permanent magnet provides a main magnetic field of an air gap, and the Alnico permanent magnet is used to adjust the magnetic field. However, as described in the background, in an existing permanent-magnet memory motor, two permanent magnets in a series magnetic circuit are NdFeB permanent magnets with high coercive force, a magnetization-state stabilization effect is obvious, and a large flux adjustment current is required. As a result, a flux adjustment range is limited. In addition, a problem that flux is large and saturation is serious further exists.

To resolve the foregoing technical problem, embodiments of this disclosure provide a permanent-magnet motor. The permanent-magnet motor may be applied to an electric vehicle (Electric Vehicle, EV for short), a pure electric vehicle (Pure Electric Vehicle/Battery Electric Vehicle, PEV/BEV for short), a hybrid electric vehicle (Hybrid Electric Vehicle, HEV for short), a range-extended electric vehicle (Range-Extended Electric Vehicle, REEV for short), a plug-in hybrid electric vehicle (Plug-in Hybrid Electric Vehicle, PHEV for short), a new energy vehicle (New Energy Vehicle), battery management (Battery Management), motor & driver (Motor & Driver), a power converter (Power Converter), a reducer (Reducer), and the like.

In embodiments of this disclosure, that the permanent-magnet motor is applied to the electric vehicle is used as an example for description. Referring to FIG. 1, an electric vehicle 100 may include a vehicle frame 40 and a motor drive system. The motor drive system is mounted on the vehicle frame 40. The vehicle frame 40 is used as a structural framework of the electric vehicle, and is configured to support, fasten, and connect each system to bear load inside the vehicle system and from an external environment.

The motor drive system is a system that includes a series of components and that is used to produce power and transmit the power to a road surface. Referring to FIG. 1, the motor drive system may include a controller 20, a battery 30, and a permanent-magnet motor 10. The battery 30 is electrically connected to the permanent-magnet motor 10, and the controller 20 is electrically connected to the permanent-magnet motor 10 to control working of the permanent-magnet motor 10. The motor drive system may further include a reducer 50, and the reducer 50 is configured to be electrically connected to the motor, to adjust a vehicle speed.

The electric vehicle 100 further includes wheels 41 disposed on the vehicle frame 40. A rotating shaft of the motor is connected to the wheels 41 by using a drive component. In this way, the rotating shaft of the motor outputs power, and the drive component transmits the power to the wheels 41, so that the wheels 41 rotate. In this embodiment of this disclosure, one or two permanent-magnet motors 10 may be included in the motor drive system. When there is one motor, the motor is connected to two front wheels or two rear wheels by using a drive component. When there are two motors, one motor is connected to two front wheels by using a drive component, and the other motor is connected to two rear wheels by using another drive component.

The motor drive system provided in this embodiment of this disclosure includes the permanent-magnet motor 10. The permanent-magnet motor 10 implements a short circuit of most magnetic lines inside a rotor during flux weakening, to reduce saturation of a magnetic circuit, so that a flux adjustment range is effectively improved, global efficiency is improved, and it is ensured that the motor drive system always maintains high efficiency in various running states.

The vehicle provided in this embodiment of this disclosure includes the motor drive system, and the motor drive system can maintain high efficiency in various running states. This can effectively increase an endurance mileage of the vehicle, and improve overall running efficiency of the vehicle.

Figure 2:
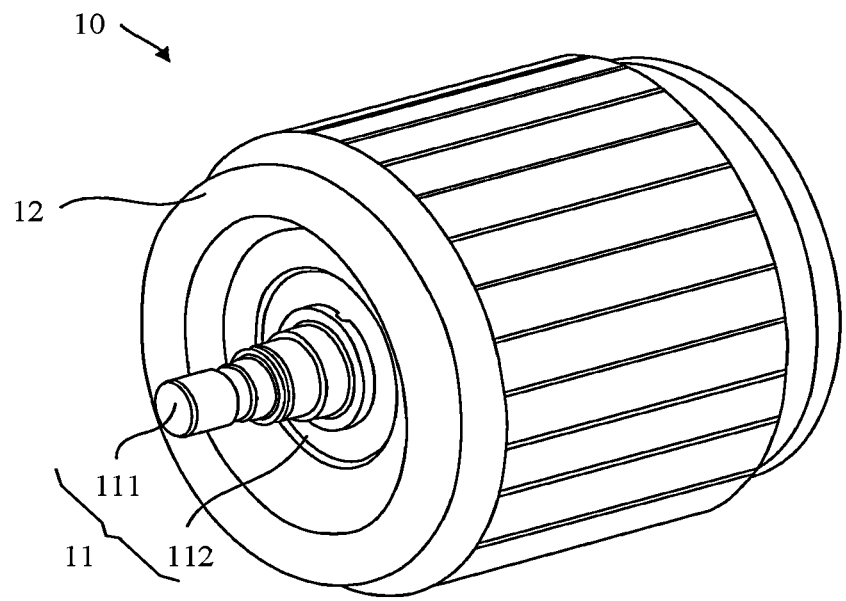
FIG. 2 is a schematic diagram of a structure of a permanent-magnet motor according to an embodiment of this disclosure.
Figure 3:
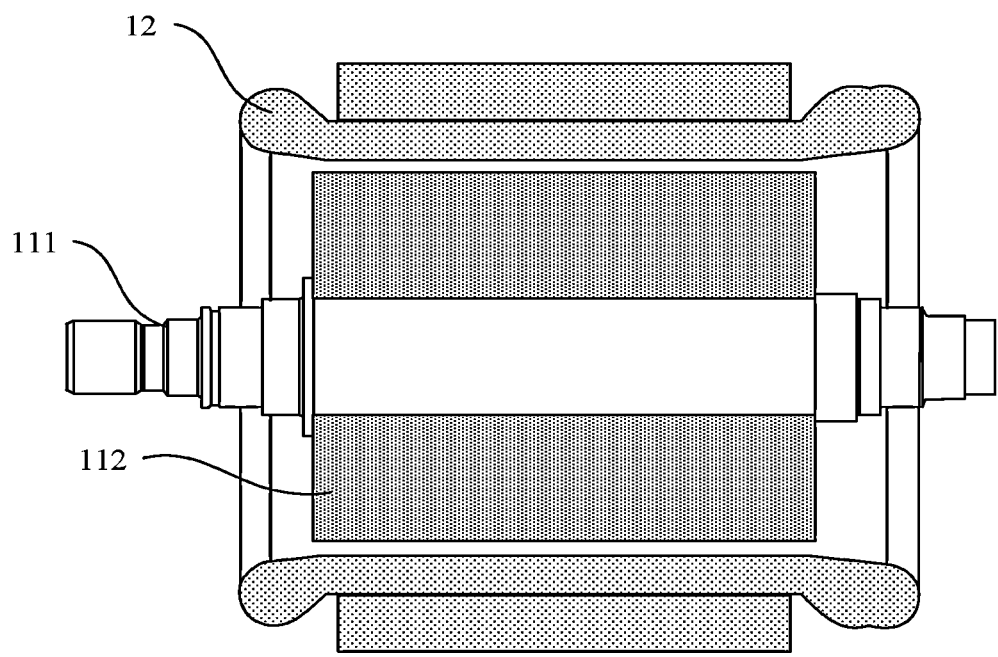
FIG. 3 is a schematic diagram of a cross-sectional structure of the permanent-magnet motor in FIG. 2.
Figure 4:
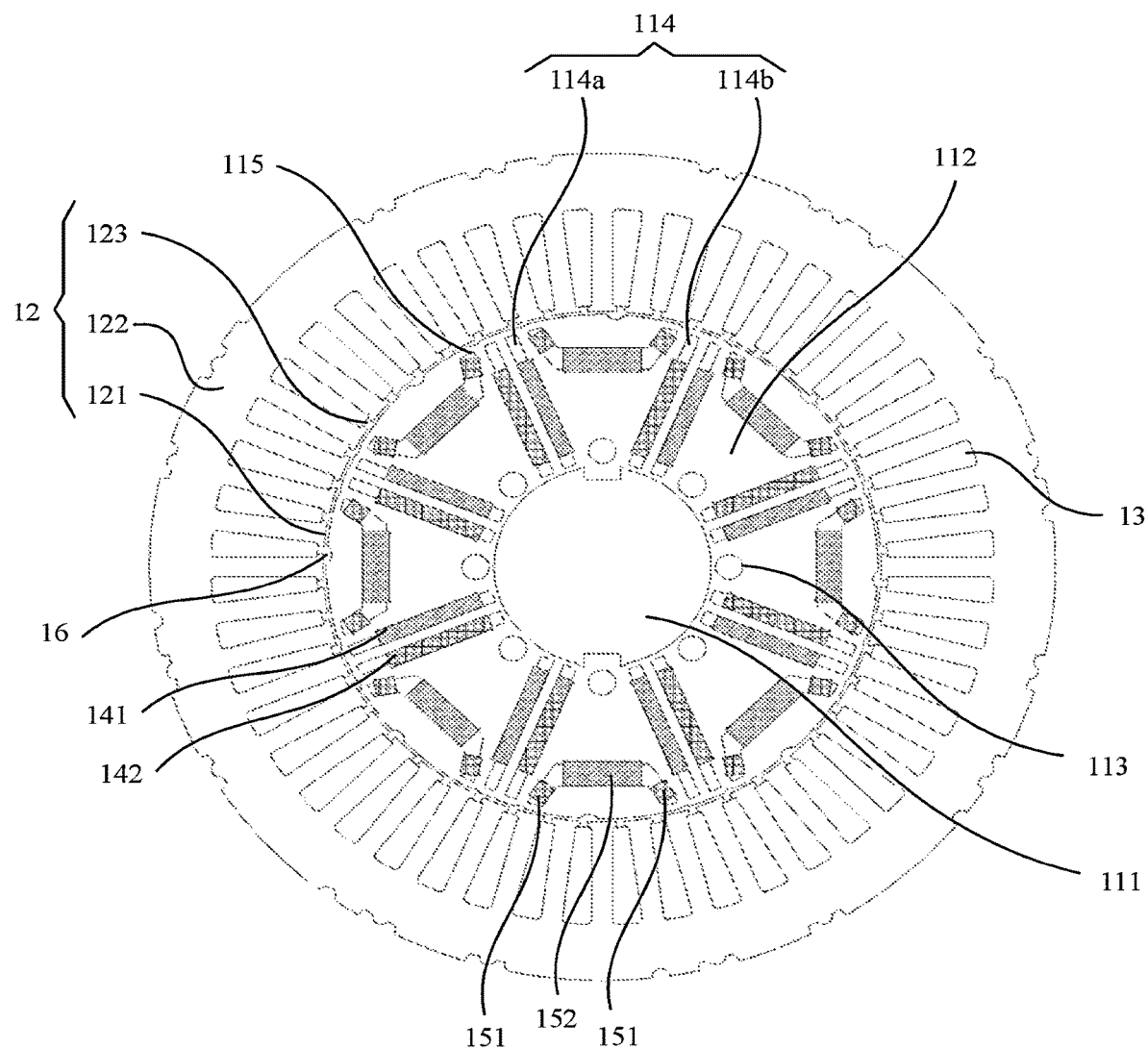
FIG. 4 is a schematic cross-sectional view of a permanent-magnet motor according to an embodiment of this disclosure.

Referring to FIG. 2 and FIG. 4, the permanent-magnet motor 10 includes a stator 12, an armature winding 13, and a rotor 11. As shown in FIG. 2 and FIG. 3, the rotor 11 may include a rotor iron core 112 and a rotating shaft 111. The rotor iron core 112 and the rotating shaft 111 may be cylindrical, and have axial and circumferential surfaces. The rotor iron core 112 has a shaft hole extending in an axial direction. The rotor iron core 112 is sleeved on the rotating shaft 111 by using the shaft hole, and is fixedly connected to the rotating shaft 111, so that the rotating shaft 111 rotates as the rotor iron core 112 rotates.

The stator 12 may have a cylindrical inner cavity. The stator 12 is sleeved on a periphery of the rotor iron core 112, to enable the rotor iron core 112 to be located in the inner cavity of the stator 12. Referring to FIG. 4, an air gap 16 is left between an outer circumferential surface of the rotor iron core 112 and a cavity wall of the inner cavity of the stator 12. The rotating shaft 111 penetrates to the outside of the inner cavity of the stator 12, to be connected to the wheels 41, so as to output torque. The stator 12 may include a stator iron core tooth 121, a stator yoke 122, and a cavity 123 formed between adjacent stator iron core teeth 121. The armature winding 13 passes through the cavity 123, and is wound on the stator iron core tooth 121.

Figure 5:
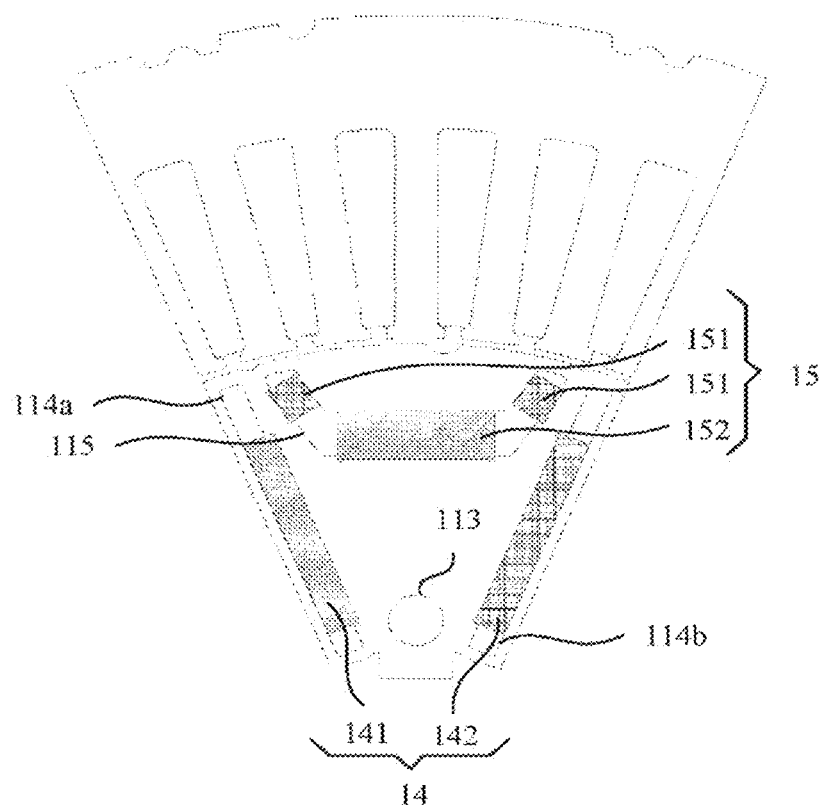
FIG. 5 is a partially enlarged view of the schematic cross-sectional view of the permanent-magnet motor in FIG. 4.

Referring to FIG. 4 and FIG. 5, in this embodiment of this disclosure, the rotor 11 further includes several first permanent-magnet structures 14. The several first permanent-magnet structures 14 are distributed on the rotor iron core 112 in a circumferential direction of the rotor iron core 112. Specifically, when there are a plurality of first permanent-magnet structures 14, the plurality of first permanent-magnet structures 14 may be evenly distributed on the rotor iron core 112 in the circumferential direction of the rotor iron core 112.

Referring to FIG. 4 and FIG. 5, each first permanent-magnet structure 14 includes a first permanent magnet 141 and a second permanent magnet 142. Both the first permanent magnet 141 and the second permanent magnet 142 are disposed in a radial direction of the rotor iron core 112. Coercive force of the first permanent magnet 141 is less than coercive force of the second permanent magnet 142. In other words, the first permanent magnet 141 is a permanent magnet with low coercive force, and the second permanent magnet 142 is a permanent magnet with high coercive force. In this way, main flux of the air gap 16 may be regulated and controlled by using a magnetization degree and a demagnetization degree of the first permanent magnet 141 with low coercive force. During flux weakening, a part of main flux generated by the second permanent magnet 142 with high coercive force is short-circuited by using the first permanent magnet 141 with low coercive force, so that a permanent magnetic field implements a short circuit of a magnetic line inside the rotor 11 during flux weakening, to reduce saturation of a magnetic circuit, and effectively improve a flux adjustment range.

Figure 6:
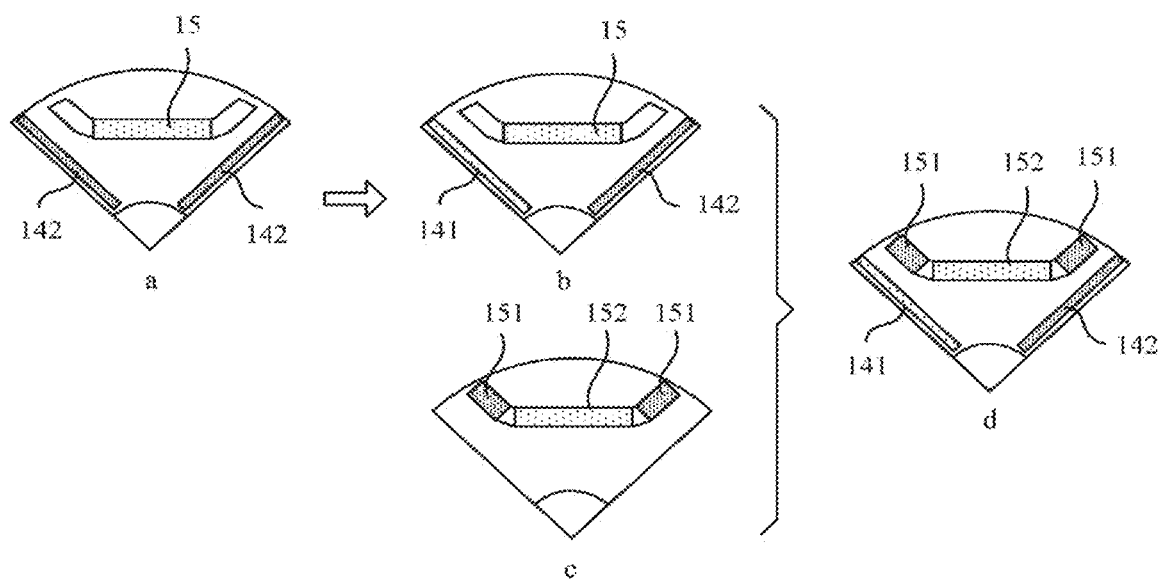
FIG. 6 is a schematic diagram of topology evolution of a permanent-magnet motor according to an embodiment of this disclosure.

As shown by a in FIG. 6, that two second permanent magnets 142 with high coercive force form a series magnetic circuit is used as an example. Compared with a permanent-magnet memory motor in the conventional technology, in the rotor 11 of the permanent-magnet motor 10 provided in this embodiment of this disclosure, coercive force of two permanent magnets used to form a series magnetic circuit is different, that is, the permanent magnet with low coercive force is disposed on one side of the series magnetic circuit (as shown by b in FIG. 6). The first permanent magnet 141 is a permanent magnet with low coercive force, and the second permanent magnet 142 is a permanent magnet with high coercive force. In this case, during flux weakening, the magnetic line inside the rotor 11 is short-circuited by using the first permanent magnet 141, so that the flux adjustment range of the motor is effectively improved, and a problem that an existing motor requires a large flux adjustment current and a flux adjustment range thereof needs to be further improved is resolved. In addition, the first permanent magnet 141 in the series magnetic circuit is the permanent magnet with low coercive force, to reduce saturation of flux inside the rotor 11, and also help improve the flux adjustment range.

Referring to FIG. 4 and FIG. 5, there are a plurality of first permanent-magnet structures 14 on the rotor iron core 112, and each first permanent-magnet structure 14 includes a first permanent magnet 141 with low coercive force and a second permanent magnet 142 with high coercive force. In this case, the first permanent magnet 141 and the second permanent magnet 142 are staggered in the circumferential direction of the rotor iron core 112, so that the first permanent magnet 141 has a stable working point, and has good magnetization-state stabilization performance. In addition, a first permanent magnet 141 and a second permanent magnet 142 that are adjacent to each other are staggered, and the first permanent magnet 141 with low coercive force blocks, to a degree, flux generated by the second permanent magnet 142 with high coercive force, so that the flux cannot pass through the air gap 16, and a magnetic energy product is weakened, to reduce saturation of the flux inside the rotor 11, and help improve the flux adjustment range.

In this embodiment of this disclosure, the rotor iron core 112 may include several rotor iron core chips (not shown in the figure). The rotor iron core chip may be cylindrical. All the rotor iron core chips are sequentially stacked in an axial direction. Circumferential profiles of the rotor iron core chips totally overlap to form the rotor iron core 112, and the first permanent-magnet structure 14 is disposed on each rotor iron core chip.

Referring to FIG. 4 and FIG. 5, in this embodiment of this disclosure, the rotor 11 further includes several second permanent-magnet structures 15. The second permanent-magnet structure 15 is located between a first permanent magnet 141 and a second permanent magnet 142 in a same first permanent-magnet structure 14, and the second permanent-magnet structure 15 is far away from the rotating shaft 111. In this way, the second permanent-magnet structure 15 and the first permanent magnet 141 form a series magnetic circuit, the second permanent-magnet structure 15 and the second permanent magnet 142 also form a series magnetic circuit, a first permanent magnet 141 and a second permanent magnet 142 in a same first permanent-magnet structure 14 form a series magnetic circuit, and a first permanent magnet 141 and a second permanent magnet 142 in adjacent first permanent-magnet structures 14 also form a series magnetic circuit, so that the motor has good magnetization-state stabilization performance.

The second permanent-magnet structure 15 may be a permanent magnet with high coercive force, or the second permanent-magnet structure 15 may be jointly formed by a permanent magnet with high coercive force and a permanent magnet with low coercive force. The second permanent-magnet structure may also be disposed on each rotor iron core chip.

Specifically, in a possible implementation, referring to FIG. 5 and FIG. 6, the second permanent-magnet structure 15 includes a third permanent magnet 151 and a fourth permanent magnet 152. The third permanent magnet 151 is located on two sides of the fourth permanent magnet 152. In this way, the third permanent magnet 151 and the fourth permanent magnet 152 form a parallel magnetic circuit (as shown by c in FIG. 6). During flux weakening, a magnetic field of the two types of permanent magnets in the parallel magnetic circuit may form a short circuit inside the rotor 11, to further improve the flux adjustment range.

Coercive force of the fourth permanent magnet 152 is less than coercive force of the third permanent magnet 151. Referring to FIG. 4 and FIG. 5, the fourth permanent magnet 152 and the second permanent magnet 142 form a series magnetic circuit structure, and a first permanent magnet 141 and a second permanent magnet 142 that are adjacent to each other also form a series magnetic circuit structure. In such a series magnetic circuit structure, a permanent magnet (the first permanent magnet 141 and the fourth permanent magnet 152) with low coercive force has magnetic line support from a permanent magnet (the second permanent magnet 142 and the third permanent magnet 151) with high coercive force, and therefore has a significant load demagnetization resistance capability.

Referring to FIG. 4, in two adjacent first permanent-magnet structures 14, a first permanent magnet 141 in one first permanent-magnet structure 14 is close to a second permanent magnet 142 in the other first permanent-magnet structure 14. In this way, a second permanent magnet 142 is disposed at a location adjacent to each first permanent magnet 141, and the second permanent magnet 142 with high coercive force may provide magnetic line support for the permanent magnet 141 with low coercive force, so that the motor has better magnetization-state stabilization performance.

In conclusion, in the permanent-magnet motor 10 provided in this embodiment of this disclosure, the permanent magnet with low coercive force is disposed on one side of the series magnetic circuit (as shown by b in FIG. 6), the first permanent magnet 141 is the permanent magnet with low coercive force, and the second permanent magnet 142 is the permanent magnet with high coercive force. In this case, during flux weakening, the magnetic line inside the rotor 11 is short-circuited by using the first permanent magnet 141, so that the flux adjustment range of the motor is effectively improved. In addition, the series magnetic circuit on which the permanent magnet with low coercive force is disposed is combined with the parallel magnetic circuit (as shown by c in FIG. 6) formed by the third permanent magnet 151 and the fourth permanent magnet 152 to obtain a mixed permanent magnetic circuit (as shown by d in FIG. 6), to further improve a flux adjustment capability.

In this embodiment of this disclosure, referring to FIG. 5, the second permanent-magnet structure 15 is U-shaped, and an opening of the second permanent-magnet structure 15 faces a side far away from the rotating shaft 111, so that the second permanent-magnet structure 15 is U-shaped, and has a very good flux aggregation effect.

It should be noted that the third permanent magnet 151 and the fourth permanent magnet 152 are combined to form the U-shaped second permanent-magnet structure 15, and a gap may be left between the third permanent magnet 151 and the fourth permanent magnet 152, or there is no gap between the third permanent magnet 151 and the fourth permanent magnet 152.

Referring to FIG. 5, the first permanent-magnet structure 14 is V-shaped, and an opening of the first permanent-magnet structure 14 faces the side far away from the rotating shaft 111. The V-shaped permanent-magnet structure has a very good flux aggregation effect, and the U-shaped second permanent-magnet structure 15 is close to the opening of the V-shaped first permanent-magnet structure 14.

Figure 7:
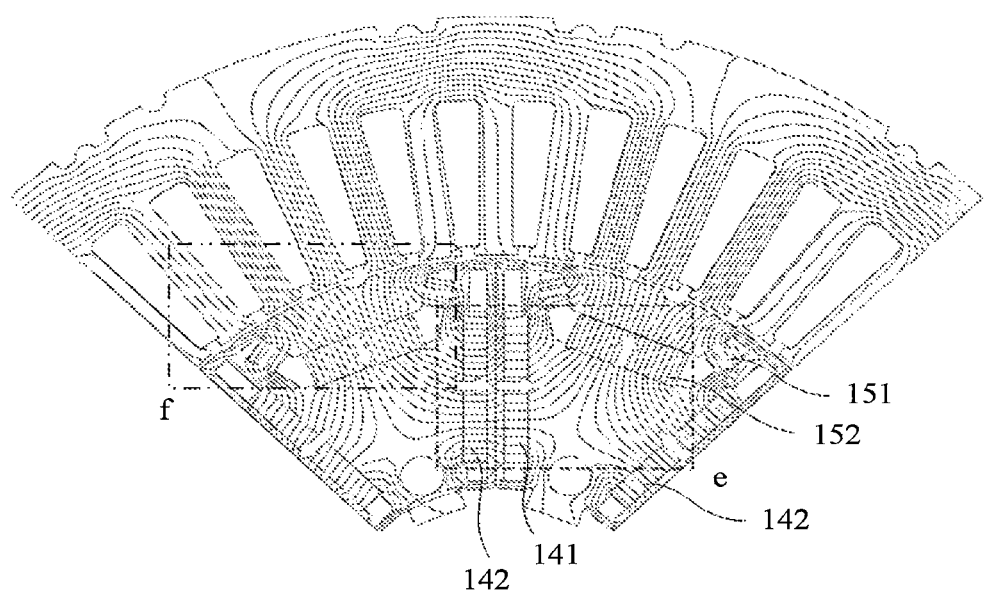
FIG. 7 is a schematic diagram of magnetic line distribution of a permanent-magnet motor in a flux enhancement state according to an embodiment of this disclosure.

Referring to FIG. 7, during initial magnetization, the first permanent magnet 141 is magnetized in a tangential direction of a circumference of the rotor iron core 112, the second permanent magnet 142 is magnetized in the tangential direction of the circumference of the rotor iron core 112 (as shown by e in FIG. 7), the fourth permanent magnet 152 is magnetized in a radial direction of the circumference of the rotor iron core 112, a plurality of third permanent magnets 151 surround a circumference, the third permanent magnet 151 is distributed in a radial direction of the circumference, and the third permanent magnet 151 is magnetized in a tangential direction of the circumference (as shown by fin FIG. 7). The first permanent magnet 141 and the second permanent magnet 142 are distributed in the radial direction of the rotor iron core 112, the third permanent magnet 151 and the fourth permanent magnet 152 that are combined to form a U shape are located between the first permanent magnet 141 and the second permanent magnet 142, and the third permanent magnet 151 is located on the two sides of the fourth permanent magnet 152. Therefore, the fourth permanent magnet 152 is located in the tangential direction of the circumference, the first permanent magnet 141 and the second permanent magnet 142 are magnetized in the tangential direction of the circumference of the rotor iron core 112, the third permanent magnet 151 is magnetized in the tangential direction of the circumference formed by the plurality of third permanent magnets 151, and the fourth permanent magnet 152 is magnetized in the radial direction of the circumference of the rotor iron core 112. In this way, flux of the four permanent magnets is superposed and then flows in a same direction.

It should be noted that the third permanent magnet 151 may be parallel to the first permanent magnet 141, that is, the third permanent magnet 151 may extend in the radial direction of the circumference of the rotor iron core 112, or there may be an angle between the third permanent magnet 151 and the first permanent magnet 141. When the third permanent magnet 151 and the first permanent magnet 141 are parallel and distributed in the radial direction of the rotor iron core 112, the third permanent magnet 151 is magnetized in the tangential direction of the circumference of the rotor iron core 112.

One first permanent-magnet structure 14 and one second permanent-magnet structure 15 form a magnetic pole, for example, a south pole or a north pole of a magnet. In this way, one magnetic pole includes one first permanent magnet 141, one second permanent magnet 142, two third permanent magnets 151, and one fourth permanent magnet 152. During initial magnetization, referring to FIG. 7, two third permanent magnets 151 at a same magnetic pole are magnetized in opposite directions, fourth permanent magnets 152 at adjacent magnetic poles are magnetized in opposite directions, a first permanent magnet 141 and a second permanent magnet 142 at a same magnetic pole are magnetized in opposite directions, and a first permanent magnet 141 and a second permanent magnet 142 at adjacent magnetic poles are magnetized in a same direction. In this way, flux of the permanent magnets is superposed and then flows in a same direction to form a loop.

Figure 8:
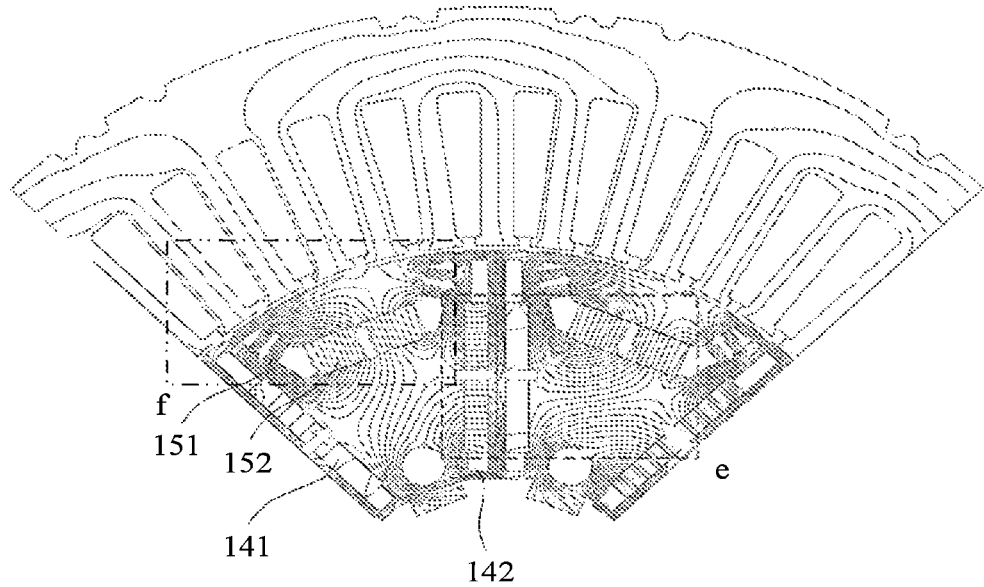
FIG. 8 is a schematic diagram of magnetic line distribution of a permanent-magnet motor in a flux weakening state according to an embodiment of this disclosure.

Referring to FIG. 8, during flux weakening, a part of permanent-magnet flux of the second permanent magnet 142 with high coercive force is short-circuited by a first permanent magnet 141 with low coercive force at a same magnetic pole, to reduce saturation of the magnetic circuit, and improve the flux adjustment range. In addition, a first permanent magnet 141 adjacent to the second permanent magnet 142 also prevents a magnetic line of the second permanent magnet 142 from passing through, to implement flux weakening, and help improve the flux adjustment capability (as shown by e in FIG. 8). In addition, the third permanent magnet 151 and the fourth permanent magnet 152 form a parallel magnetic circuit structure. During flux weakening, a part of flux of the third permanent magnet 151 with high coercive force in the parallel magnetic circuit is also short-circuited inside the rotor 11 by the fourth permanent magnet 152 with low coercive force (as shown by fin FIG. 8), to further improve the flux adjustment capability, and expand the flux adjustment range.

A running principle of the permanent-magnet motor provided in this embodiment of this disclosure is as follows: If magnetization directions of the fourth permanent magnet 152 that is radially magnetized and the first permanent magnet 141 that is tangentially magnetized are shown in FIG. 7, the fourth permanent magnet 152 and the first permanent magnet 141 are in a flux enhancement state. Permanent-magnet flux first starts from a north pole of the second permanent magnet 142 that is tangentially magnetized. After a part of the flux passes through the third permanent magnet 151, the flux arrives at the stator iron core tooth 121 through the rotator iron core and the air gap 16, then passes through the stator yoke 122, returns to the first permanent magnet 141 by using a same path, and finally returns to a south pole of the second permanent magnet 142. Another part of the flux arrives at a south pole of the fourth permanent magnet 152. Permanent-magnet flux of the fourth permanent magnet 152 and flux of the third permanent magnet 151, the first permanent magnet 141, and the second permanent magnet 142 are superposed and then flow in a same direction. If magnetization directions of the fourth permanent magnet 152 and the first permanent magnet 141 are shown in FIG. 8, a flux direction between the fourth permanent magnet 152 and the first permanent magnet 141 is opposite to a flux direction between the third permanent magnet 151 and the second permanent magnet 142. In this case, the fourth permanent magnet 152 and the first permanent magnet 141 are in a flux weakening state, and most flux of the second permanent magnet 142 and permanent-magnet flux of the fourth permanent magnet 152 and the first permanent magnet 141 are short-circuited inside the rotor. At the same time, a three-phase alternating current consistent with a rotation speed of the rotor 11 is introduced into the armature winding 13, and interacts with a rotating magnetic field formed by the rotor 11, to implement electromechanical energy conversion.

In this embodiment of this disclosure, referring to FIG. 4 and FIG. 5, a magnetic barrier 113 is further disposed on the rotor iron core 112, the magnetic barrier 113 is located between the first permanent magnet 141 and the second permanent magnet 142, and the magnetic barrier 113 is close to the rotating shaft 111. The magnetic barrier 113 can enhance direct-axis magnetic resistance, to reduce magnetic leakage.

A shape of the magnetic barrier 113 is a circle. Compared with an existing manner of using a triangular magnetic barrier or the like, each triangular magnetic barrier is generally distributed in the radial direction of the rotor iron core 112, and extends from an end of the rotor iron core 112 close to the rotating shaft 111 to an end of the rotor iron core 112 close to the stator 12. As a result, stress distribution of the rotor iron core 112 is saturated, it is difficult to ensure mechanical strength of the rotor 11, and the rotor iron core 112 is not applicable to a high-speed running area. However, in this embodiment of this disclosure, the magnetic barrier 113 is circular, and is close to the rotating shaft 111, so that such a problem can be avoided, and the circular magnetic barrier 113 can facilitate mechanical treatment of the rotor 11.

Referring to FIG. 4, a quantity of first permanent-magnet structures 14 is the same as a quantity of second permanent-magnet structures 15, and the quantity is an even number, to ensure that a flux circuit is formed.

Specifically, in this embodiment of this disclosure, the first permanent magnet 141 is an Alnico permanent magnet, the second permanent magnet 142 is an NdFeB permanent magnet, the third permanent magnet 151 may also be an NdFeB permanent magnet, and the fourth permanent magnet 152 may also be an Alnico permanent magnet. The Alnico (Alnico) permanent magnet is an iron alloy. In addition to iron, aluminum (Al), nickel (Ni), cobalt (Co), and a small quantity of other components for enhancing magnetism are added. The permanent magnet has low coercive force. The NdFeB permanent magnet (NdFeB magnet) is a tetragonal-system crystal formed by neodymium, iron, and boron ($Nd_2Fe_{14}B$), and has high coercive force.

Referring to FIG. 4 and FIG. 5, the first permanent magnet 141 and the second permanent magnet 142 may be linear. One linear first permanent magnet 141 and one linear second permanent magnet 142 form a V-shaped first permanent-magnet structure 14. The third permanent magnet 151 and the fourth permanent magnet 152 may also be linear. The linear fourth permanent magnet 152 is used as the bottom of the U-shaped structure, and the two linear third permanent magnets 151 are respectively located on two sides of the U-shaped structure, to form the second permanent-magnet structure 15.

In a possible implementation, referring to FIG. 4, a first magnetic groove 114 and a second magnetic groove 115 are disposed on the rotor iron core 112, the first permanent-magnet structure 14 is disposed in the first magnetic groove 114, and the second permanent-magnet structure 15 is disposed in the second magnetic groove 115. The first magnetic groove 114 and the second magnetic groove 115 each may be a groove that are formed on a surface of the rotor iron core chip when the rotor iron core chip is molded, and are used to place the first permanent-magnet structure 14 and the second permanent-magnet structure 15. The first magnetic groove 114 may include a first magnetic groove part 114a used to place the first permanent magnet 141 and a second magnetic groove part 114b used to place the second permanent magnet 142.

The rotor iron core 112 includes several rotor iron core chips, and a first magnetic groove 114 and a second magnetic groove 115 are disposed on each rotor iron core chip. Several first magnetic grooves 114 and several second magnetic grooves 115 are disposed on each rotor iron core chip. Based on a product performance requirement, magnetic grooves at a same location on the rotor iron core chips may form a specified location relationship. For example, all magnetic grooves at a same location on the rotor iron core chips totally overlap, that is, on the rotor iron core chips, locations of the first magnetic grooves 114 overlap, and locations of the second magnetic grooves 115 also overlap. Alternatively, all magnetic grooves at a same location on the rotor iron core chips may be sequentially staggered.

Correspondingly, shapes of the first magnetic groove 114 and the second magnetic groove 115 respectively correspond to the first permanent-magnet structure 14 and the second permanent-magnet structure 15. Specifically, in this embodiment of this disclosure, the first magnetic groove 114 may be V-shaped, and the second magnetic groove 115 may be U-shaped.

In the permanent-magnet motor 10 provided in this embodiment of this disclosure, the rotor 11 of the permanent-magnet motor 10 includes the first permanent magnet 141 and the second permanent magnet 142 that are distributed in the radial direction of the rotor iron core 112, and the coercive force of the first permanent magnet 141 is less than the coercive force of the second permanent magnet 142. During flux weakening, a part of main flux is short-circuited by using the first permanent magnet 141 with low coercive force, so that a permanent magnetic field implements a short circuit of the magnetic line inside the rotor 11 during flux weakening, to reduce saturation of the magnetic circuit, and effectively improve the flux adjustment range of the permanent-magnet motor 10. In addition, the rotor 11 further includes the third permanent magnet 151 and the fourth permanent magnet 152. The third permanent magnet 151 and the fourth permanent magnet 152 form a parallel magnetic circuit structure. During flux weakening, a magnetic field of the two types of permanent magnets may form a short circuit inside the rotor 11, to further improve the flux adjustment capability of the permanent-magnet motor 10, and expand the flux adjustment range.

Figure 9:
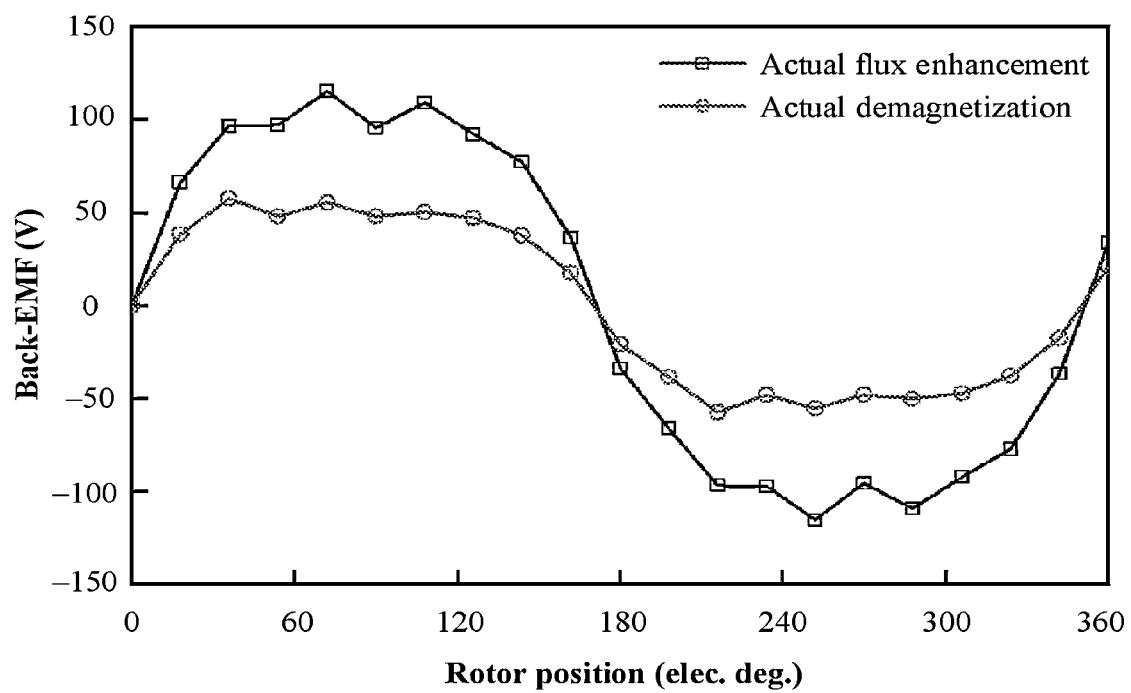
FIG. 9 is a back-electromotive force diagram of a permanent-magnet motor in different magnetization states according to an embodiment of this disclosure.
Figure 10:
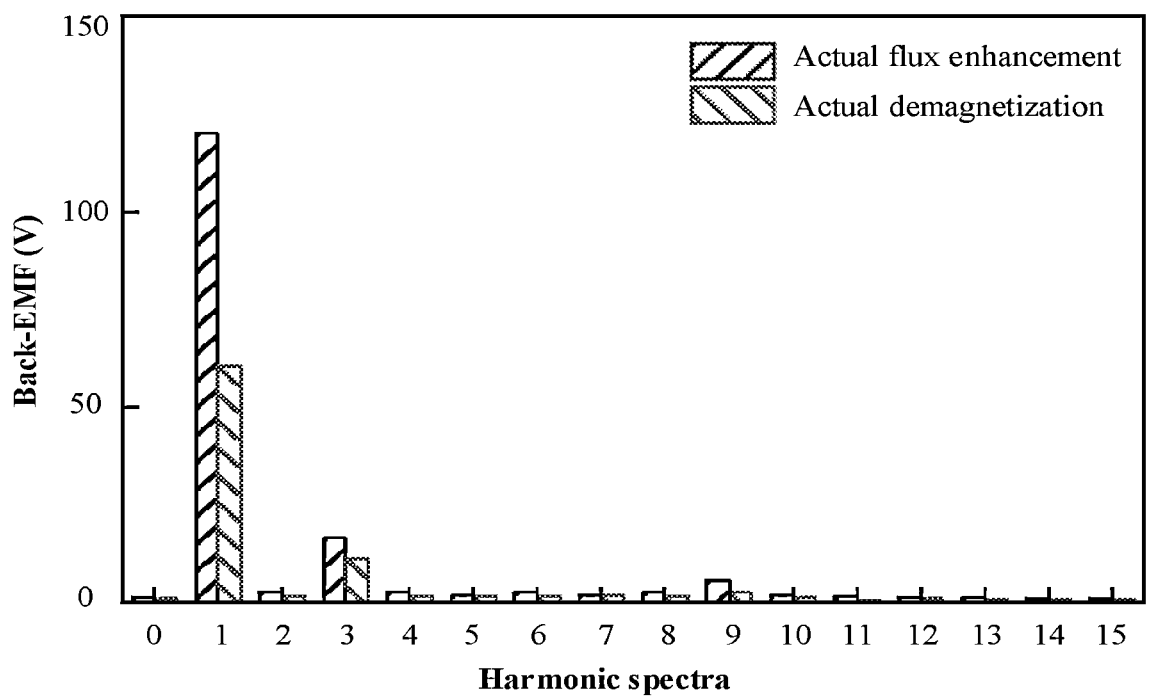
FIG. 10 is an analysis diagram of a back-electromotive force harmonic wave of a permanent-magnet motor in different magnetization states according to an embodiment of this disclosure.

Under a limitation of a maximum flux adjustment current 318 Arms and a maximum direct current bus voltage 470 V, no-load back-electromotive force in an actual flux enhancement case and an actual flux weakening case may directly reflect the flux adjustment capability of the motor. Referring to FIG. 9 and FIG. 10, back-electromotive force of the permanent-magnet motor 10 provided in this embodiment of this disclosure is detected. It may be learned from FIG. 9 and FIG. 10 that, for the structure of the permanent-magnet motor provided in this embodiment of this disclosure, a multiple of a fundamental amplitude of the back-electromotive force thereof during flux enhancement or flux weakening is 119.97 V/60.48 V=1.984 times, and the motor has a significant flux adjustment capability.

Figure 11:
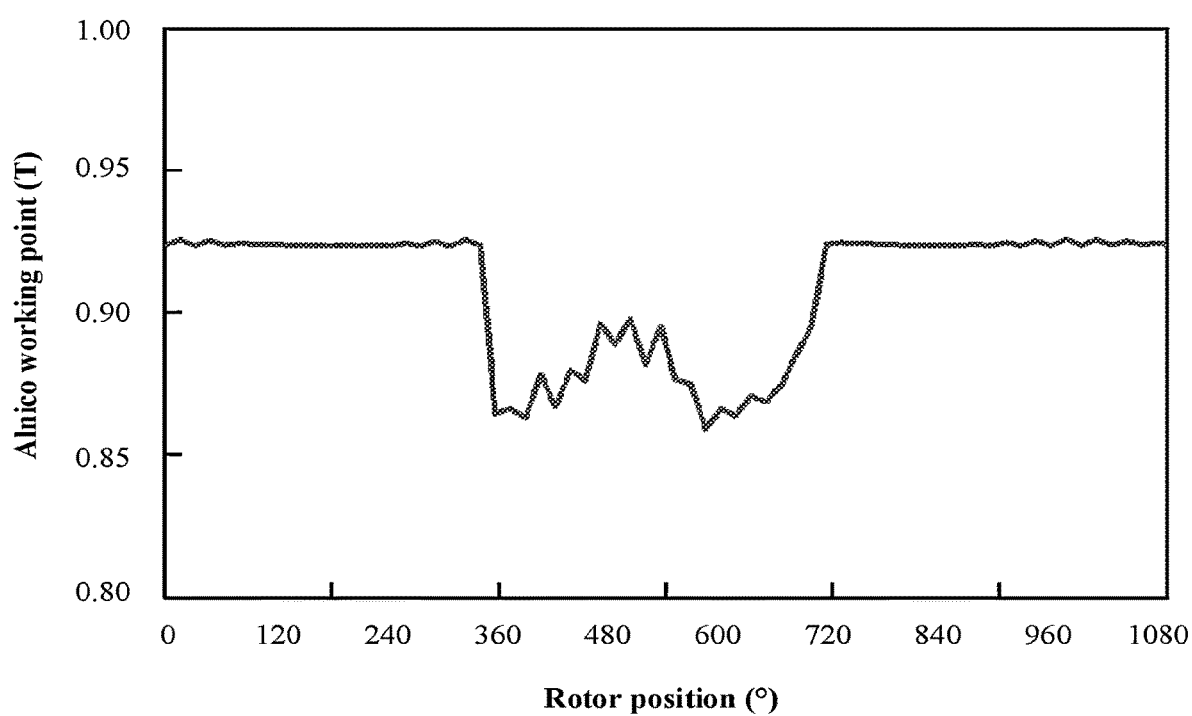
FIG. 11 is a stability diagram of a working point of a permanent-magnet motor according to an embodiment of this disclosure.

During running of the motor, stability of a working point of the permanent magnet with low coercive force is very important. Referring to FIG. 11, in the permanent-magnet motor 10 provided in this embodiment of this disclosure, because a fourth permanent magnet 152 and a second permanent magnet 142 at a same magnetic pole form a series magnetic circuit, and a first permanent magnet 141 and a second permanent magnet 142 at adjacent magnetic poles also form a series magnetic circuit structure, and a permanent magnet with high coercive force in the series magnetic circuit can ensure that the permanent magnet with low coercive force has high magnetic line support. Therefore, the permanent magnet with low coercive force has a significant load demagnetization resistance capability, to stabilize the working point of the permanent magnet with low coercive force.

Figure 12:
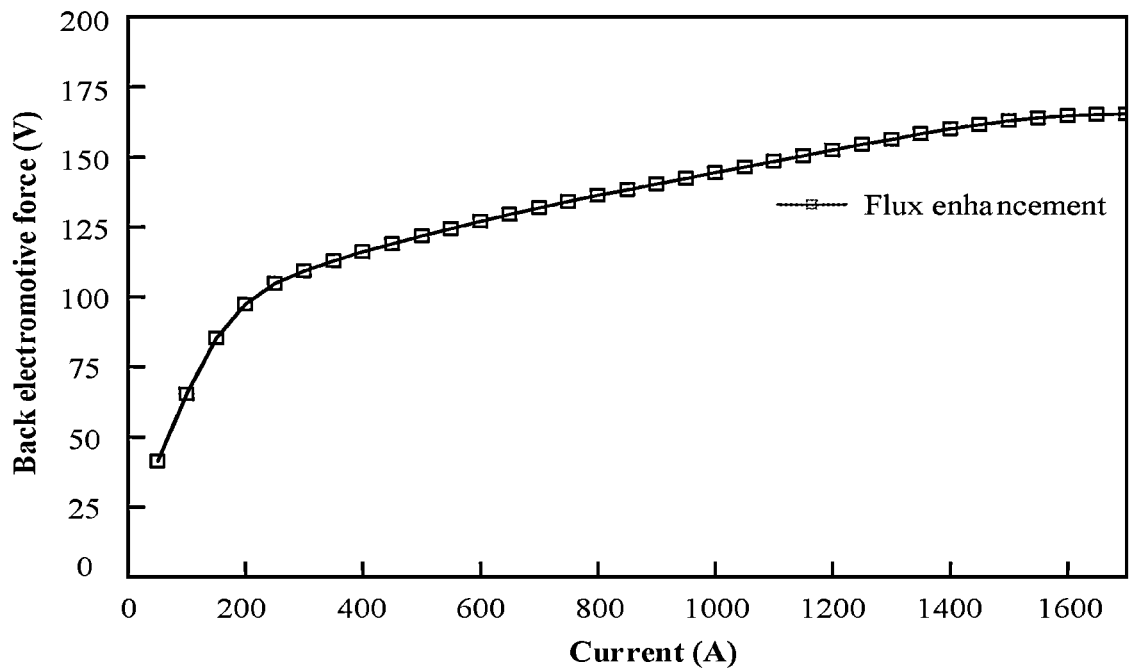
FIG. 12 is a flux enhancement current diagram of a permanent-magnet motor according to an embodiment of this disclosure.
Figure 13:
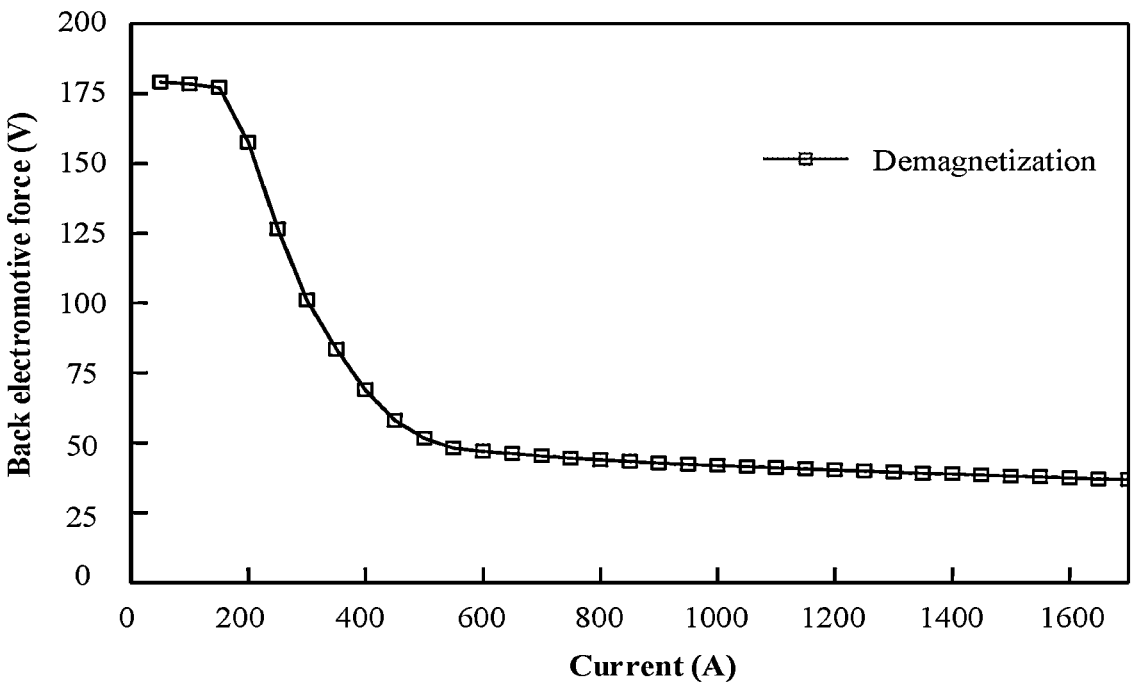
FIG. 13 is a demagnetization current diagram of a permanent-magnet motor according to an embodiment of this disclosure.

In this embodiment of this disclosure, when flux adjustment is performed on the permanent-magnet motor 10, a short-duration pulse may be used to perform flux adjustment on the permanent-magnet motor 10, there is almost no excitation copper loss, and repeated demagnetization can be implemented. Referring to FIG. 12 and FIG. 13, flux adjustment is performed on the motor by using a d-axis pulse current. On a basis of ensuring stability of the working point of the permanent magnet with low coercive force, the structure of the permanent-magnet motor 10 may implement a short circuit of most flux of the permanent magnetic field inside the rotor 11, so that the flux adjustment range is effectively improved, and the permanent-magnet motor 10 has a significant flux adjustment capability.

In the descriptions of embodiments of this disclosure, it should be noted that unless otherwise specified or limited, terms "mount", "communicate", and "connect" shall be understood in a broad sense, for example, may be a fixed connection, may be an indirect connection by using an intermediate medium, or may be a connection between the inside of two elements or an interaction relationship between two elements. A person of ordinary skill in the art may understand specific meanings of the foregoing terms in embodiments of this disclosure based on a specific case.

In the specification, claims, and accompanying drawings of embodiments of this disclosure, the terms "first", "second", "third", "fourth", and so on (if existent) are intended to distinguish between similar objects but do not necessarily indicate a specific order or sequence.

What is claimed is:

1. A rotor of a permanent-magnet motor, comprising:
a rotating shaft;
a rotor iron core sleeved on the rotating shaft; and
several first permanent-magnet structures distributed on the rotor iron core in a circumferential direction of the rotor iron core, wherein each first permanent-magnet structure comprises a first permanent magnet and a second permanent magnet that are disposed in a radial direction of the rotor iron core, and are configured to generate coercive forces such that a coercive force of the first permanent magnet is less than coercive force of the second permanent magnet,
wherein a first line connecting two ends of the first permanent magnet, when extended, passes through the rotating shaft, and a second line connecting two ends of the second permanent magnet, when extended, passes through the rotating shaft;
wherein the first permanent magnet and the second permanent magnet are non-contacting and parallel to each other; and
wherein a magnetization degree and a demagnetization degree of the first permanent magnet are used to control and regulate main flux of an air gap, so that a part of main flux generated by the second permanent magnet is short-circuited.

2. The rotor according to claim 1, further comprising several second permanent-magnet structures, wherein a second permanent-magnet structure of the several second permanent-magnet structures is located between a first permanent magnet and a second permanent magnet in a same first permanent-magnet structure, and the second permanent-magnet structure is far away from the rotating shaft.

3. The rotor according to claim 2, wherein the second permanent-magnet structure comprises a third permanent magnet and a fourth permanent magnet, and the third permanent magnet is located on two sides of the fourth permanent magnet.

4. The rotor according to claim 3, wherein coercive force of the fourth permanent magnet is less than coercive force of the third permanent magnet.

5. The rotor according to claim 4, wherein, in two adjacent first permanent-magnet structures, a first permanent magnet in a first one of the two adjacent first permanent-magnet structures is closer to a second permanent magnet in a second one of the two adjacent first permanent-magnet structures than a second permanent magnet in the first one of the two adjacent first permanent-magnet structures is to the second permanent magnet in the second one of the two adjacent first permanent-magnet structures.

6. The rotor of claim 5, wherein the second permanent magnet in the second one of the two adjacent first permanent-magnet structures is between the first permanent magnet in the first one of the two adjacent first permanent-magnet structures and the first permanent magnet in the second one of the two adjacent first permanent-magnet structures, and the first permanent magnet in the second one of the two adjacent first permanent-magnet structures is between the second permanent magnet in the first one of the two adjacent first permanent-magnet structures and the second permanent magnet in the second one of the two adjacent first permanent-magnet structures.

7. The rotor according to claim 3, wherein the first permanent magnet and the second permanent magnet are separately magnetized in a tangential direction of a circumference of the rotor iron core, the third permanent magnet is magnetized in a tangential direction of a circumference surrounded by a plurality of third permanent magnets, and the fourth permanent magnet is magnetized in a radial direction of the circumference of the rotor iron core.

8. The rotor according to claim 7, wherein a first permanent-magnet structure of the several first permanent-magnet structures and the second permanent-magnet structure form a magnetic pole, two third permanent magnets at a same magnetic pole are magnetized in opposite directions, fourth permanent magnets at adjacent magnetic poles are magnetized in opposite directions, a first permanent magnet and a second permanent magnet at a same magnetic pole are magnetized in opposite directions, and a first permanent magnet and a second permanent magnet at adjacent magnetic poles are magnetized in a same direction.

9. The rotor according to claim 8, wherein a magnetic barrier is further disposed on the rotor iron core, the magnetic barrier is located between the first permanent magnet and the second permanent magnet, and the magnetic barrier is close to the rotating shaft.

10. The rotor according to claim 9, wherein a shape of the magnetic barrier is a circle.

11. The rotor according to claim 10, wherein a quantity of the several first permanent-magnet structures is the same as a quantity of the several second permanent-magnet structures, and the quantity is an even number.

12. The rotor according to claim 11, wherein the first permanent magnet is an Alnico permanent magnet, and the second permanent magnet is an NdFeB permanent magnet.

13. The rotor according to claim 3, wherein the third permanent magnet is an NdFeB permanent magnet, and the fourth permanent magnet is an Alnico permanent magnet.

14. The rotor according to claim 2, wherein the second permanent-magnet structure is U-shaped, and an opening of the second permanent-magnet structure faces a side far away from the rotating shaft.

15. The rotor according to claim 14, wherein a first permanent-magnet structure of the several first permanent-magnet structures is V-shaped, and an opening of the first permanent-magnet structure faces the side far away from the rotating shaft.

16. The rotor according to claim 2, wherein a first magnetic groove and a second magnetic groove are disposed on the rotor iron core, a first permanent-magnet structure of the several first permanent-magnet structures is disposed in the first magnetic groove, and the second permanent-magnet structure is disposed in the second magnetic groove.

17. A permanent-magnet motor, comprising a stator, an armature winding, and a rotor, wherein the stator is sleeved on a periphery of a rotor iron core of the rotor, and the armature winding is disposed on the stator, the rotor including
a rotating shaft;
the rotor iron core sleeved on the rotating shaft; and
several first permanent-magnet structures distributed on the rotor iron core in a circumferential direction of the rotor iron core, wherein each first permanent-magnet structure comprises a first permanent magnet and a second permanent magnet that are disposed in a radial direction of the rotor iron core, and are configured to generate coercive forces such that a coercive force of the first permanent magnet is less than coercive force of the second permanent magnet, wherein a first line connecting two ends of the first permanent magnet, when extended, passes through the rotating shaft, and a second line connecting two ends of the second permanent magnet, when extended, passes through the rotating shaft;

wherein the first permanent magnet and the second permanent magnet are non-contacting and parallel to each other; and wherein a magnetization degree and a demagnetization degree of the first permanent magnet are used to control and regulate main flux of an air gap, so that a part of main flux generated by the second permanent magnet is short-circuited.

18. The permanent-magnet motor according to claim 17, wherein the rotor further comprises several second permanent-magnet structures, wherein a second permanent-magnet structure of the several second permanent-magnet structures is located between a first permanent magnet and a second permanent magnet in a same first permanent-magnet structure, and the second permanent-magnet structure is far away from the rotating shaft.

19. An electric vehicle, comprising a vehicle frame and a motor drive system, wherein the motor drive system is mounted on the vehicle frame, the motor drive system comprising a stator, an armature winding, and a rotor, wherein the stator is sleeved on a periphery of a rotor iron core of the rotor, and the armature winding is disposed on the stator, the rotor including a rotating shaft;

the rotor iron core sleeved on the rotating shaft; and several first permanent-magnet structures distributed on the rotor iron core in a circumferential direction of the rotor iron core, wherein each first permanent-magnet structure comprises a first permanent magnet and a second permanent magnet that are disposed in a radial direction of the rotor iron core, and are configured to generate coercive forces such that a coercive force of the first permanent magnet is less than coercive force of the second permanent magnet, wherein a first line connecting two ends of the first permanent magnet, when extended, passes through the rotating shaft, and a second line connecting two ends of the second permanent magnet, when extended, passes through the rotating shaft;

wherein the first permanent magnet and the second permanent magnet are non-contacting and parallel to each other; and wherein a magnetization degree and a demagnetization degree of the first permanent magnet are used to control and regulate main flux of an air gap, so that a part of main flux generated by the second permanent magnet is short-circuited.

20. The electric vehicle according to claim 19, wherein the rotor further comprises several second permanent-magnet structures, wherein a second permanent-magnet structure of the several second permanent-magnet structures is located between a first permanent magnet and a second permanent magnet in a same first permanent-magnet structure, and the second permanent-magnet structure is far away from the rotating shaft.

* * * * *